UNITED STATES PATENT OFFICE.

LOUIS HILKE, OF BELLEVUE, PENNSYLVANIA.

LINIMENT.

SPECIFICATION forming part of Letters Patent No. 416,730, dated December 10, 1889.

Application filed August 22, 1889. Serial No. 321,670. (No specimens.)

*To all whom it may concern:*

Be it known that I, LOUIS HILKE, of Bellevue, Pennsylvania, have invented a new and useful Improvement in Liniment for Scalds and Burns, which improvement is fully set forth in the following specification.

My composition consists of the following ingredients, combined in the proportions stated, viz: flaxseed-oil, three ounces; chalk, three ounces; vinegar, one and one-half ounce; chamomile infusion, one-half ounce.

In making my composition I prefer to use the best English pulverized chalk, though the American chalk will do. In preparing the chamomile I take the dry flowers and boil the same, preferably in vinegar, and I use the liquid thus made. These ingredients are to be thoroughly mixed by agitation. When thus mixed, there will be enough of the composition to fill an eight-ounce bottle; but for greater or less bottles the proportions will have to be changed.

In using the above composition in case of a scald or burn, the bottle should be well shaken and the composition spread on a piece of lint of sufficient size to cover the injured part, and should be kept on for forty-eight hours before being renewed. This will keep the air away from the scalded or burned part, and when removed there will be no blisters and the healing will be rapid. Of course the application should be made quite soon after the burn or scald is made.

Having thus described my invention, what I claim, and desire to secure by Letters Patent, is—

The herein-described liniment to be used on burns or scalds, consisting of flaxseed-oil, chalk, vinegar, and chamomile, in the proportions specified.

LOUIS HILKE.

Witnesses:
JOHN H. CRATTY,
C. P. WALKER.